Oct. 21, 1952 — H. TOOMIM — 2,615,149
DERIVATIVE CONTROL OF SERVO SYSTEMS
Original Filed March 6, 1945 — 3 Sheets-Sheet 1
Fig. 1
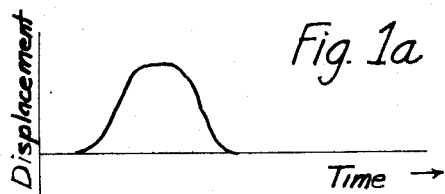
Fig. 1a
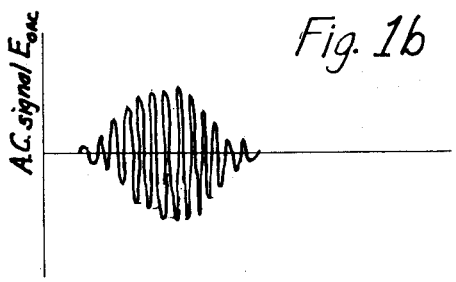
Fig. 1b
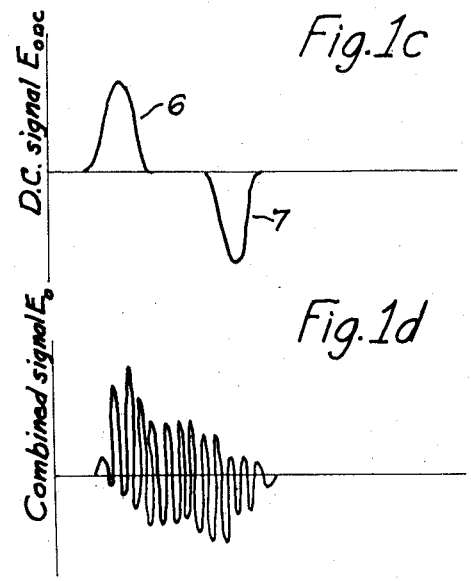
Fig. 1c
Fig. 1d
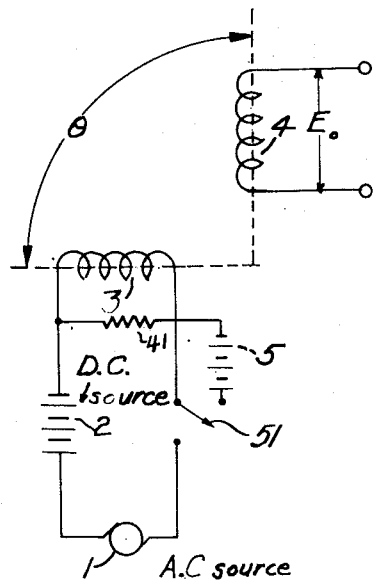
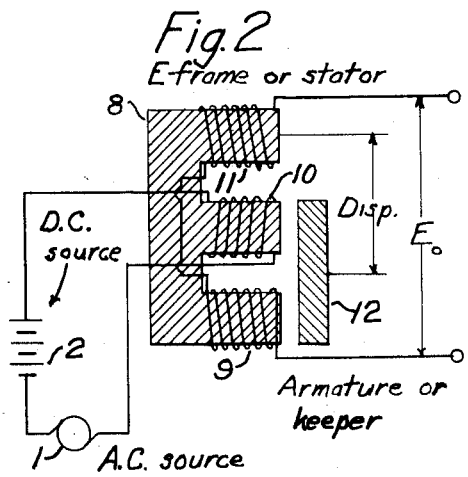
Fig. 2
INVENTOR.
Hershel Toomim
BY Darby + Darby
ATTORNEYS

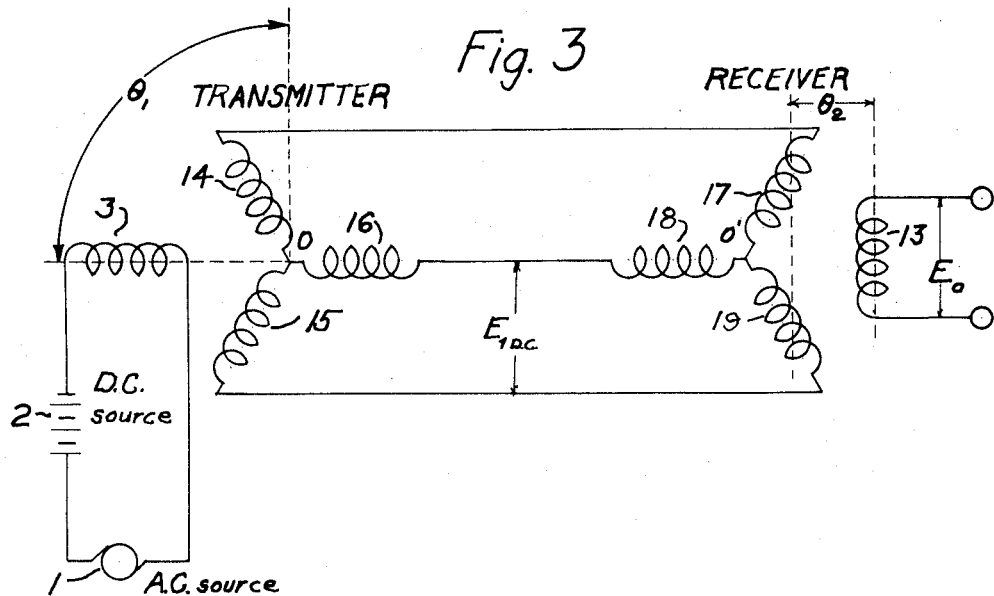
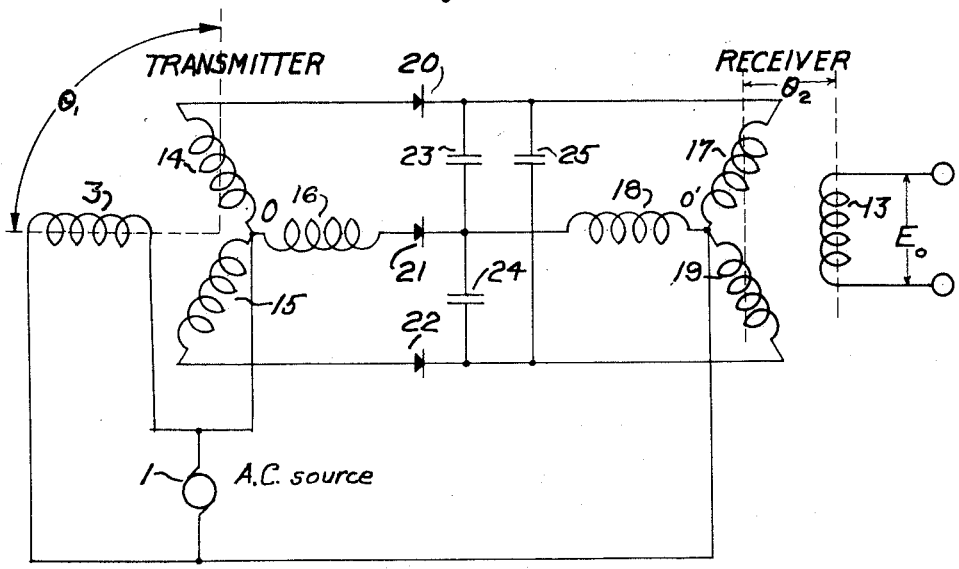

INVENTOR.
Hershel Toomim
BY Darby + Darby
ATTORNEYS

Patented Oct. 21, 1952

2,615,149

UNITED STATES PATENT OFFICE 2,615,149

DERIVATIVE CONTROL OF SERVO SYSTEMS

Hershel Toomim, Douglaston, N. Y.

Original application March 6, 1945, Serial No. 581,296. Divided and this application February 10, 1950, Serial No. 144,561

6 Claims. (Cl. 318—24)

The present application is a division of my application Serial No. 581,296, filed March 6, 1945, and entitled "Derivative Control of Servo Systems."

In a signal transmitting system it is often desirable to transmit and utilize not only the primary signal itself, but derived information concerning its rate of change, direction of change, etc.

For example, a system for transmitting information pertaining to the angular displacement of a shaft from a given setting may involve a transmitter synchro connected to the said shaft, a receiver synchro, an amplifier, and a mechanical means of driving the shaft of the receiver synchro, together with any apparatus connected thereto, to the position called for by the transmitted signal. Due to mechanical inertia, such a system would be liable to hunting or oscillation at its natural mechanical resonant frequency. Circuits are therefore added to the amplifier of such a system for obtaining a derivative signal whose value and phase depend upon the rate and direction of change of the displacement or error signal. The function of such a derivative signal is twofold:

1. To provide additional torque when the error signal is increasing in order to overcome inertia of mechanical elements of the system.

2. To provide negative or reverse torque as the mechanical system approaches the called for position of the receiver rotor and apparatus geared to its shaft, in order to overcome inertia of the moving parts, which would make the system overshoot and hunt.

In the simple system described, only the first derivative has been considered. In practice, two or more derivatives of the error signal may be required to be added to the error signal for correct operation of the mechanical system it is desired to position.

The use of derivatives in a servo system is described, for example, in copending application of Francis H. Shepard, Jr., Serial No. 499,774, filed August 24, 1943, for "Follow-Up Device."

A study of present systems for obtaining derivative signals reveals that considerable complication of the amplifier circuits is necessary and that the derivatives obtained by such circuits are good only up to some relatively limited rate of change of the error signal, beyond which they lose their desired 90 degree phasing. This invention involves the introduction of direct current fields into selsyn units to obtain derivatives directly.

Methods for producing voltages in conductors by means of moving magnetic fields are characterized by simplicity and linear operation which faithfully represents all velocities of the relative motions inducing the voltages. This application covers several variations of related systems intended to combine the advantages of movement-generated D. C. derivative signals with position-generated A. C. error signals in servo systems.

Accordingly, it is an object of this invention to provide a simple means for producing one or more D. C. derivatives of a signal in a servo mechanism.

A feature of my invention is that the derivatives are produced independently of frequency. In other words, the derivatives will be accurately produced despite the rate of change of the error signal.

Another feature of my invention is that my simplified means for obtaining a first D. C. derivative permits second and other subsequent derivatives to be derived easily and with more simple circuits than have heretofore been necessary.

In the drawings,

Figure 1 is a simplified circuit diagram of one form which my invention might take, and which is primarily useful in permitting a simple explanation of the principles involved;

Figures 1a to 1d are curves illustrating the operation of Figure 1; and

Figures 2 to 7 are circuit diagrams of other forms of my invention, Figures 4 and 5 being the forms which are preferred for practical use at the present time.

In the drawings similar reference numerals refer to similar or corresponding parts in the various figures.

Figure 5:
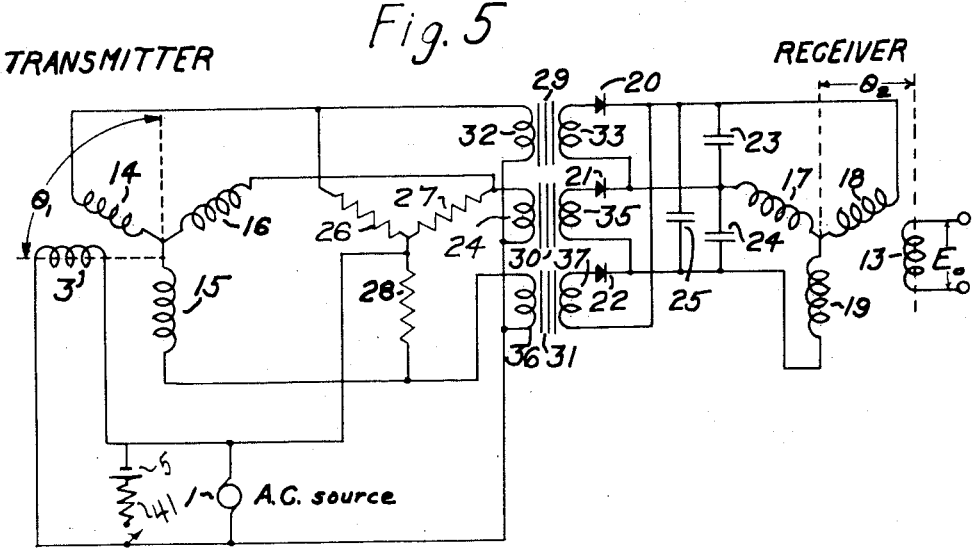

Referring to Figure 1, I have shown an A. C. source 1 connected in series with a D. C. source 2 through a coil 3 which may be rotatable with respect to a second coil 4 in inductive relation therewith. I have also shown a second source of D. C. voltage 5, connected through a resistance 41, which may be used alternatively to the source 2 as by means of a switch 51.

In simplest form, my invention would consist, as shown in Figure 1, in applying a D. C. component to the rotor or stator of a single-coil rotor, single-coil stator pickup or rotatable transformer. It is illustrated as applied to the rotor 3. Movement of the rotor 3 with respect to the stator 4 would result in an A. C. signal whose amplitude and phase would indicate angular position, and a D. C. component depending on the rate and direction of motion $$\frac{(d \sin \theta)}{dt}$$

varying the axis of the A. C. signal above or below zero or ground potential. This is shown graphically in the idealized oscillograph traces in Figures 1a to 1d, representing the case where the rotor or stator has been displaced to one side of the null point and subsequently returned to zero displacement position.

Figure 1a illustrates a particular example of an angular displacement and replacement of the rotor 3 through a certain interval of time, the displacement being indicated on the vertical axis and time on the horizontal axis, and the particular displacement illustrated being less than 90 degrees.

Figure 1b illustrates the voltage which would be induced in the secondary 4 during this interval of time if no D. C. were present. It will be observed that for a small angular displacement of the rotor 3 there is a small A. C. voltage induced in the secondary 4 which increases in direct proportion to the angle of displacement. As the rotor 3 is returned to its original position the A. C. voltage induced in the secondary accordingly falls until it returns to zero.

Figure 1c illustrates the voltage which is induced into the secondary 4 because of the movement of the rotor 3 just referred to due to the presence of the D. C. voltage source 2 or 5 in the circuit of coil 3. Due to this D. C. there will be steady current flowing in the coil 3 causing a steady flux in this coil which when coil 3 is stationary will induce no voltage in the secondary 4 because it is not changing. When the position of coil 3 changes there will be a change in the lines of force which cut the coil 4 and there will be induced therein a voltage illustrated in Figure 1c by the curve 6. This curve, as illustrated, rises to a positive value and descends to zero during the time that the coil 3 is moving in one direction. The curve represents velocity of the coil 3 and is therefore the first derivative of the position of this coil and, as explained above, provides a secondary voltage which is useful in the operation of a servo system. Similarly, when the coil 3 is replaced to its zero position the D. C. magnetic field will induce in the secondary 4 a voltage illustrated by the curve 7 in Figure 1c which is equal and opposite to the curve 6 and will be useful in a servo system for reasons which have already been described.

Figure 1d illustrates the total voltage induced in the secondary 4. That is, it is the combination of the voltages of Figure 1b with those of Figure 1c.

The circuit shown in Figure 1 is a rotatable transformer used alone, the voltage output of which could be fed to suitable amplifying equipment which, for example, might be used to drive a motor to reposition the rotor shaft back to its null position, or drive the rotor shaft to a new position called for by a new position of the stator. In this latter case, the system would be a complete torque amplifying system used, for example, to drive and position cumbersome mechanical equipment in response to a very light and delicate force acting through a small distance. A typical application would be the positioning of the control surfaces of an aircraft in response to relative motion of the aircraft and small gyroscopes used as attitude references.

Figure 2 shows my invention applied to a standard E transformer or electromagnetic signal pickoff unit consisting of an E-shaped iron core 8 carrying three windings 9, 10 and 11. The central winding 10 or primary provides the A. C. and D. C. fields. The two outside windings, 9 and 11, yield an A. C. voltage of phase and amplitude proportional to the direction and amount of displacement of the armature or keeper 12. D. C. voltage or current is also induced in the output windings, its amplitude and polarity depending upon direction and rate of motion of the armature and the direction of the D. C. field current. This D. C. voltage is therefore the first derivative of the error or displacement signal.

It will be understood in the circuit of Figure 2 that the armature 12 may be displaced in one direction or the other by the device which creates the error signal, such as a gyro device in the case of an automatic pilot, while the E frame 9 can be fixed to the body of a plane, thus creating relative movement between the frame and its armature depending on a change in direction of the plane. The error signal thus created could then be used as explained above to provide a restoring force to maintain the plane in a standard desired condition of flight.

The circuit of Figure 3 shows the D. C. source applied to the transmitter of a conventional selsyn system such as shown in the Shepard application referred to above. In such a system the error signal induced in the coil 13 may be amplified and caused to operate a suitable mechanism which it is desired to control, and also to rotate the coil 13 to a position corresponding to that of the coil 3. That is, desired motion is indicated by the movement of the coil 3 by the operator of the device, and this causes the desired motion while also moving the coil 13 to a new position to reposition the coil 13 to zero output when the desired motion has been completed.

Since the constant D. C. field of the transmitter rotor cuts the windings of the stator during relation motion of the windings, a first derivative of the displacement signal will be induced in the stator windings. With selsyn units, a second derivative of the displacement signal will be found mixed with the displacement signal in the output of the receiver rotor.

In Figure 4 there is illustrated a preferred form of my invention in which there is no separate D. C. source, but in which the D. C. is produced within the selsyn system by the use of rectifiers. Such rectifiers are illustrated at 20, 21 and 22. The transmitter selsyn is illustrated by the rotor winding 3 and stator windings 14, 15 and 16 while the receiver selsyn is illustrated by the rotor winding 13 and corresponding stator windings 17, 18 and 19. The circuit also includes three condensers illustrated at 23, 24 and 25.

Referring now to Figure 4, in order for the motion-generated D. C. to be in accordance with the equation $E_0$ D. C. $= d \sin (\theta_1 - \theta_2)$ the position and sense of the D. C. field must correspond with the A. C. field, regardless of the new null positions to which the rotor of the selysn transmitter may be moved. This is accomplished automatically in the case of the application of the D. C. to the rotor as in Figure 3. However, as stated above, such a procedure in the case of a complete transmitter and receiver selsyn system, provides second, rather than first derivative voltage of position (not error or difference) in the output of the receiver.

The circuit of Figure 4 shows a method for providing a D. C. field which yields a first derivative voltage, both of transmitter or displacement signal and of rebalancing or receiver re-positioning signal. The difference of these two signals constitutes the error signal E ($\theta_1-\theta_2$) and the resulting derivative will be of $\theta_1-\theta_2$. The D. C. field at all times assumes the position and sense of the A. C. field. This circuit requires that the midpoint or junction of the stator windings be brought out to a separate terminal. A. C. input is applied to the rotor and to the neutrals 0 and 0'. It should be noted that current may flow only in one direction in the stator windings of the circuit of Figure 4. However, the A. C. error or displacement signal is transmitted quite effectively in terms of the relative ratios of the amplitudes of the half-cycle pulses transmitted and received. This rectification has the effect of introducing large second and other harmonics into the system but does not interfere with the accurate operation of the system in transmitting the displacement signal. Since the relative amplitudes of the undirectional current pulses through the stator windings of both transmitter and receiver are governed by the position of the rotor of the transmitter, the angular position of the D. C. field in both units is likewise dependent upon the position of the transmitter rotor. The capacitors 23, 24 and 25 provide a means for controlling the ratio of D. C. to A. C. in the selsyn receiver windings, and may have any value from zero to 2 to 3 microfarads or even more.

It is necessary to apply A. C. input between the neutrals 0 and 0' in order to phase the diode rectifiers properly to provide rectification of current through any particular diode at one position of the rotor 3 and avoid rectification 180 degrees therefrom. Without this A. C. input, the D. C. field would rotate twice for one rotation of the transmitter rotor. This may be understood by considering the phase relationships in any pair of stator windings for instance the windings 16 and 18. At a particular position of the rotor 3 which may be considered a position of zero degrees with respect to winding 16 there will be an alternating current induced in the winding 16 which will be in phase with the voltage supplied to this winding directly from the A. C. source 1. The forward half cycle of this current will pass through the rectifier 21, through the winding 18 and back to the source 1. For 180° rotation of the coil 3, however, the current introduced in the coil 16 will be directly out of phase with the current supplied directly from the source 1. Accordingly, on the forward half cycle of induced current the A. C. current supplied directly from the source 1 will be opposite to that induced from coil 3 to coil 16, so there will be less current through the rectifier for this position of the coil 3. The same explanation applies to each of the other windings for corresponding positions of the rotor 3 with respect to them. Accordingly, if the rotor 3 were continuously rotated there would be pulses of forward current through each rectifier 20, 21 and 22 which would reach a maximum once for each complete rotation of the coil 3. Therefore, the direct current field in the stator windings in the transmitter and receiver selsyn will always correspond in angular posiiton with the A. C. field induced by the rotor 3. Accordingly, there will, as before, be a signal induced in the receiver rotor 13 by and proportional to the first derivative of the relative motion of rotor 3 to the transmitter stator windings as well as by relative motion of the rotor 13 to the receiver stator windings.

If no neutrals are available or if it is desired to isolate the transmitter and receiver or receivers for D. C., the circuit of Figure 5 may be used. In this figure there are shown resistors 26, 27 and 28 and transformers 29, 30 and 31 having respectively, primaries 32, 34 and 36 and secondaries 33, 35 and 37. In this circuit three Y-connected resistors 26, 27 and 28 serve as a false neutral, and three transformers 29, 30 and 31 isolate the circuits for D. C. The three diode rectifiers 20, 21 and 22 provide the D. C. component, while capacitors 23, 24 and 25 control the ratio of D. C. to A. C. field strength. The D. C. field set up by the stator windings of the receiver follows in space and is superimposed on the A. C. field resulting from the position of the transmitter rotor.

Figure 6:
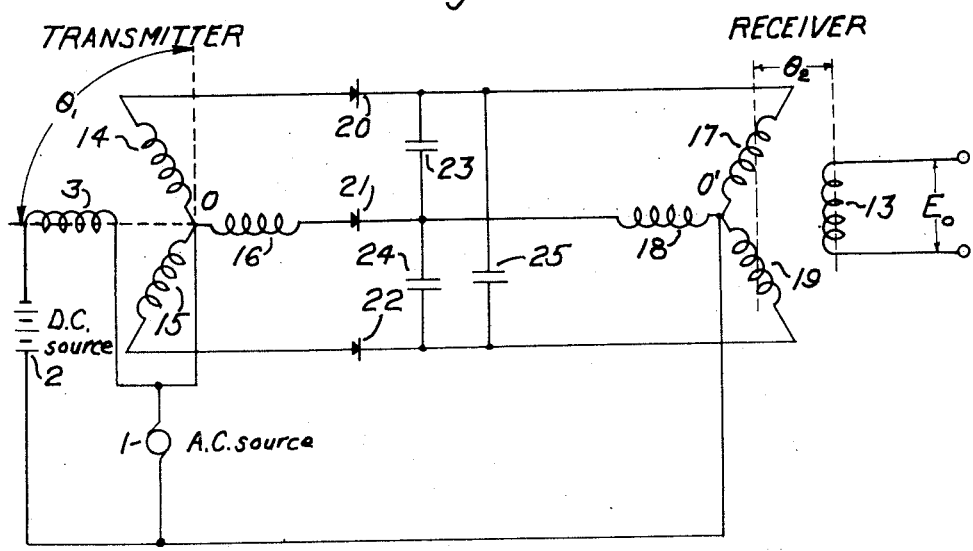

The circuit of Figure 6 illustrates the use of two D. C. components for the production in the output of a combined error signal, its first derivative, and the second derivative of the transmitter signal. The circuit is exactly similar to that of Figure 4, except for the addition of the battery or other D. C. source in series or parallel with the A. C. source used to excite the rotor of the transmitter, as in Figure 3.

Thus Figure 6 is a combination of Figures 3 and 4. In the case of Figure 3 there is produced in the coil 13 the second derivative of motion of the coil 3 and this is also produced in the coil 13 of Figure 6. In the case of Figure 4 there is produced in the coil 13 the first derivative of motion of the coil 3 as well as the derivative of motion of coil 13, and this also appears in coil 13 of Figure 6. Therefore, in Figure 6, motion of the transmitter rotor 3 with respect to its stator windings will produce in output coil 13 first and second derivatives of said motion and motion of coil 13 with respect to the receiver stator windings will produce in coil 13 first derivative of said motion. In both cases A. C. error signal will appear in the coil 13.

Direct current could similarly be applied across the rotor 3 of Figure 5, with the same results except that where a second derivative may be obtained in Figure 6, a third derivative may be obtained in Figure 5 with such a D. C. source added.

In the manufacture of signal pickoff units, transmitters, or receivers, some of the desired effects could be obtained by introducing a fixed amount of permanent, polarized magnetization into the rotors. In some applications this would be equivalent to introducing a direct current from an external source.

One further advantage of this method of obtaining a D. C. derivative directly from the synchro transformer output is that second and other subsequent derivatives may be derived easily and with more simple circuits than are required in securing derivatives of A. C. derivatives.

Figure 7:
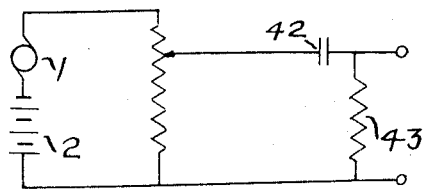

In Figure 7 I have illustrated a simple circuit for use in a servo system in which A. C. and D. C. are combined through a potentiometer having a tap which provides the error signal. This system has the advantage of permitting the use of an A. C. error signal which has many advantages but it also permits the use of a simple derivative circuit such as condenser 42 and resistance 43 by means of which the first derivative of position may be obtained due to the presence of the D. C.

current from the source 2. Thus, in this circuit I introduce a direct current into the device from which an A. C. error signal is derived for the purpose of simplifying the taking of derivative voltages.

Figs. 2, 3, and 6, a D. C. source 5 and resistor 41 may be shunt connected as in Fig. 1, in place of source 2.

It will be understood that the various values and arrangements illustrated are illustrative and that my invention is not restricted to the particular, specific details shown. It will also be understood by those skilled in the art that my invention is capable of various modifications. I do not desire therefore to be restricted to the particular details shown and described but only within the scope of the appended claims.

What is claimed is:

1. A servo system comprising a transmitter selsyn, a receiver selsyn, a source of alternating current connected across the transmitter rotor and across the neutral points of the transmitter and receiver selsyns, and a rectifier between each winding of the transmitter selsyn and its corresponding winding on the receiver selsyn.

2. A servo system comprising a transmitter selsyn, a receiver selsyn, a source of alternating current connected across the transmitter rotor and across the neutral points of the transmitter and receiver selsyns, a rectifier between each winding of the transmitter selsyn and its corresponding winding on the receiver selsyn, and a condenser connected across each pair of windings of the receiver selsyn.

3. A servo system comprising a transmitter selsyn, a receiver selsyn, a source of alternating current connected across the rotor of said transmitter, and also connected across the neutral points of said transmitter and receiver selsyn stators, a source of direct current connected to said transmitter rotor, and a rectifier connecting the outer end of each transmitter stator winding with the outer end of each corresponding receiver stator winding.

4. A servo system comprising a transmitter selsyn, a receiver selsyn, a source of alternating current connected across the rotor of said transmitter, and also connected across the neutral points of said transmitter and receiver selsyn stators, a source of direct current connected to said transmitter rotor, a rectifier connecting the outer end of each transmitter stator winding with the corresponding outer end of each receiver stator winding, and a condenser connected across each pair of receiver stator windings.

5. A motion transmitting system comprising a transmitter synchro, a receiver synchro coupled to said transmitter synchro, each of said synchros comprising a polyphase winding having a neutral junction, a plurality of rectifiers, each winding of said receiver polyphase winding being connected to a corresponding winding of said transmitter polyphase winding in series with a rectifier, and means for impressing an alternating voltage between said neutral junctions whereby a direct current field is produced in said windings.

6. A transmitter for a motion transmitting system adapted to be connected to a receiver and comprising a rotor element adapted to be adjusted in position in correspondence with a driving member, a stator element cooperating with said rotor element, one of said elements having a single phase exciting winding, the other of said elements having a polyphase output winding inductively coupled to said single phase winding and adapted to be connected to said receiver, means supplying alternating current to said single phase winding to produce an alternating magnetic field, and means superposing a direct current magnetic field on said alternating magnetic field, said last means comprising a rectifier connected in series with each winding of said polyphase winding and a source of alternating current connected to said polyphase winding to be rectified by said rectifiers, whereby said polyphase winding produces alternating signals representing both the displacement of said driving member from a datum position and a time derivative of said displacement.

HERSHEL TOOMIM.

REFERENCES CITED

The following references are of record in the file of this patent:

UNITED STATES PATENTS

| Number | Name | Date |
|---|---|---|
| 2,048,082 | Riggs | July 21, 1936 |
| 2,227,474 | Weathers | Jan. 7, 1941 |
| 2,442,764 | Ferrill et al. | June 8, 1948 |

FOREIGN PATENTS

| Number | Country | Date |
|---|---|---|
| 472,259 | Great Britain | Sept. 20, 1937 |
| 488,831 | Great Britain | July 14, 1938 |
| 765,083 | France | June 1, 1934 |